United States Patent
Ji et al.

(10) Patent No.: US 8,306,025 B2
(45) Date of Patent: Nov. 6, 2012

(54) METHOD FOR IMPLEMENTING SUBSCRIBER PORT POSITIONING BY BROADBAND ACCESS EQUIPMENTS

(75) Inventors: Lin Ji, Shenzhen (CN); Liquan Yuan, Shenzhen (CN); Huannan Ma, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 475 days.

(21) Appl. No.: 12/674,676

(22) PCT Filed: Dec. 12, 2007

(86) PCT No.: PCT/CN2007/003566
§ 371 (c)(1),
(2), (4) Date: Feb. 22, 2010

(87) PCT Pub. No.: WO2009/023998
PCT Pub. Date: Feb. 26, 2009

(65) Prior Publication Data
US 2011/0129221 A1    Jun. 2, 2011

(30) Foreign Application Priority Data

Aug. 23, 2007    (CN) .......................... 2007 1 0147525

(51) Int. Cl.
*H04L 12/28* (2006.01)
(52) U.S. Cl. .............. 370/389; 398/43; 398/44; 398/45; 398/46; 398/58
(58) Field of Classification Search ............ 370/351, 370/389–411; 398/45–643
See application file for complete search history.

(56) References Cited

U.S. PATENT DOCUMENTS

| | | | |
|---|---|---|---|
| 2007/0110441 A1* | 5/2007 | Saito et al. .................... | 398/71 |
| 2007/0116466 A1 | 5/2007 | Gewirtzman et al. | |
| 2007/0212072 A1* | 9/2007 | Iannone et al. ................. | 398/72 |
| 2008/0267626 A1 | 10/2008 | Niu | |
| 2008/0273878 A1* | 11/2008 | Wu et al. ....................... | 398/67 |

FOREIGN PATENT DOCUMENTS

| CN | 1968087 A | 5/2007 |
|---|---|---|
| CN | 1997240 A | 7/2007 |

OTHER PUBLICATIONS

English Translation of the Written Opinion of the International Search Authority in international application No. PCT/CN2007/003566, mailed on Jun. 12, 2008.
International Search Report in international application No. PCT/CN2007/003566, mailed Jun. 12, 2008.

* cited by examiner

*Primary Examiner* — Charles C Jiang
(74) *Attorney, Agent, or Firm* — Oppedahl Patent Law Firm LLC

(57) ABSTRACT

A method for implementing the subscriber port positioning by broadband access equipments, includes: when the subscriber initiates an access request, the multi-port terminal equipment captures the access request message, adds the subscriber basic information into the access request message, and transmits it to the office equipment; the single-port terminal equipment forwards the access request message to the office equipment directly; the office equipment captures the access request message, adds the terminal basic information into the access request message and forwards it to the broadband access server; for the multi-port terminal equipment, the terminal basic information and the subscriber basic information comprises the subscriber port positioning information; for the single-port terminal equipment, the terminal basic information is taken as the subscriber port positioning information; after the broadband access server receives the access request message, it extracts the subscriber port positioning information. The present invention realizes the accurate positioning for the subscriber when one GPON port of the office equipment connects multiple terminal equipments.

12 Claims, 2 Drawing Sheets

METHOD FOR IMPLEMENTING SUBSCRIBER PORT POSITIONING BY BROADBAND ACCESS EQUIPMENTS

RELATED APPLICATIONS

This Application is a National Phase of International Application No. PCT/CN2007/002566, entitled "A METHOD OF THE BROADBAND ACCESS EQUIPMENT FOR IMPLEMENTING THE SUBSCRIBER PORT POSITIONING", which was filed on Dec. 12, 2007, and which claims priority of Chinese Patent Application No. 200710147525.8, filed on Aug. 23, 2007.

TECHNICAL FIELD

The present invention relates to the field of broadband access communications, especially to a method for implementing subscriber port positioning by broadband access equipments, and relates more specifically to a method for implementing subscriber port positioning by a Gigabit-capable Passive Optical Network (GPON) access system.

BACKGROUND

One of the current broadband access techniques is Digital Subscriber Line (DSL) access technique, a DSL convergence equipment (office equipment) is connected with a subscriber terminal equipment via a twisted pair, and the connection mode is point-to-point connection. As to broadband service, in order to distinguish the subscribers, when a subscriber is accessed to a network, the location of the access subscriber can be indentified by filling related port information in access protocol packet, and the information can be used as the authentication information of a broadband access server. For example, a subscriber can be authenticated according to the physical location of the port, user name and password. As to the cases when Dynamic Host Configuration Protocol (DHCP) and Point-to-Point Protocol over Ethernet (PPPoE) are applied for network access, the DSL convergence equipment activates the function of DHCP option 82 or PPPoE+, while no other process is performed at the subscriber terminal equipment, and the DSL convergence equipment adds the related port information into DHCP or PPPoE protocol packets, and sends the protocol packets to a corresponding access authentication server, wherein the port information comprises access node identity, access node rack number, access node frame number, access node slot number and sub-slot number, access node port number, the Virtual LAN (VLAN) for a subscriber to access, and so on, so that the access authentication server can perform corresponding authentication process according to relevant information. This method can solve the widespread problems of broadband subscriber account being stolen and one account being accessed at multiple points.

GPON is a gigabit-level broadband access technique, providing wider access broadband. An office equipment (OLT, Optical Line Terminal) and a terminal equipment (ONU, Optical Network Unit) are connected via a fiber in GPON, and the extended connection distance between the office equipment and subscriber terminal equipment can be as long as dozens of kilometers, while that of DSL can only be up to about 6 kilometers, so GPON is a new broadband access technique. Each GPON port of the office equipment is connected with a plurality of optical network terminals through a point-to-multipoint optical splitter, and different terminals share one GPON office equipment port, therefore, the GPON office equipment can not distinguish the accessed terminal subscribers merely through physical ports of the office equipment.

GPON terminal equipments comprises equipments with single port and that with multiple ports, as to a multi-port GPON terminal equipment, it is further required to identify the port information of subscribers.

SUMMARY

The present invention provides a method for implementing subscriber port positioning by broadband access equipments, to solve the problem that subscribers can not be positioned when multiple terminal equipments are connected to one GPON port of a GPON office access equipment.

To solve the above-mentioned problem, the present invention provides a method for implementing subscriber port positioning by broadband access equipments, applied in a GPON system, comprising the following steps:

(1) when a subscriber initiates an access request for a multi-port terminal equipment, the terminal equipment capturing an access request message, adding subscriber basic information into the access request message and sending this message to an office equipment, or when the subscriber initiates an access request for a single-port terminal equipment, the terminal equipment directly forwarding the access request message to the office equipment;

(2) the office equipment capturing the access request message, adding terminal basic information into the access request message and forwarding this message to a broadband access server; wherein, for the multi-port terminal equipment, the terminal basic information and the subscriber basic information together make up subscriber port positioning information, and for the single-port terminal equipment, the terminal basic information alone makes up the subscriber port positioning information;

(3) after receiving the access request message sent by the subscriber, the broadband access server extracting the subscriber port positioning information.

Further, in step (3), after extracting the subscriber port positioning information, the broadband access server further sends the subscriber port positioning information to an authentication server for binding authentication of subscriber account, password and the subscriber port positioning information of the subscriber.

Further, in step (1), the subscriber basic information comprises one of or a combination of several of the following information:

slot number and sub-slot number of the terminal node, port number of the access node, and corresponding virtual port information.

Further, in step (2), the terminal basic information is used for identifying different terminal equipments connected to the office equipment port, so as to position different terminal equipments; the terminal basic information comprises: physical port information of the office equipment for the subscriber to access and ID information of the terminal equipment.

Further, in step (2), the terminal basic information further comprises:

one of or the combination of GPON encapsulation mode port identity and corresponding virtual port information.

Further, in step (2), the physical port information comprises one of or a combination of several of the following information:

access node identity, access node rack number, access node frame number, access node slot number and sub-slot number, and access node port number.

Further, the corresponding virtual port information comprises:

virtual local area network port information, or virtual path identifier/virtual channel identifier.

Further, the office equipment is an Optical Line Terminal (OLT), and the terminal equipment is an Optical Network Unit (ONU).

Further, the access manners of the subscriber comprise: Point-to-Point Protocol over Ethernet dial-in access, and Dynamic Host Configuration Protocol dial-in access.

Compared with existing techniques, the method provided by the present invention implements accurate positioning of subscribers when multiple terminal equipments are connected to one GPON port of a GPON office access equipment, namely under a point-to-multipoint connection mode.

DETAILED DESCRIPTION

Figure 1:
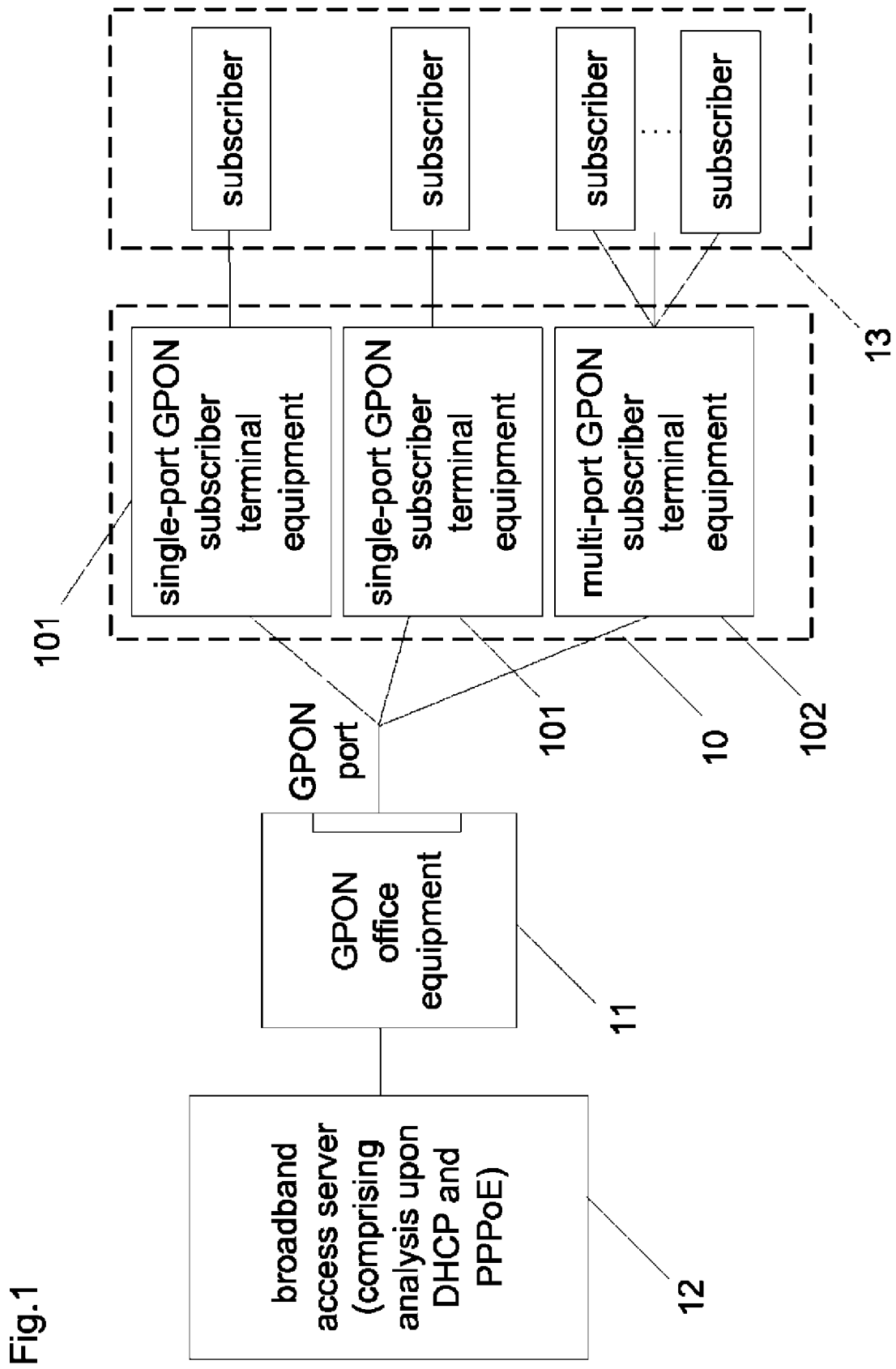
FIG. 1 is a diagram illustrating the point-to-multipoint connection relationship between a GPON office equipment and subscriber terminal equipment.

In order to overcome the disadvantages of conventional technical schemes, the present invention adopts the following methods:

A GPON office equipment takes its own physical port information of subscriber access (one of or a combination of several of such information as access node identity, access node rack number, access node frame number, access node slot number and sub-slot number, access node port number, VLAN for a subscriber to access) and information identifying different GPON terminals (ONU ID) as the basic information, to mark different terminal equipments that are connected to a GPON port. ONU IDs of different subscriber terminal equipments connected to the same GPON port are different.

As to a single-port GPON terminal, when a subscriber initiates an access request through a connected subscriber terminal equipment, the GPON office equipment adds related port information into access request protocol packet, and besides the above-mentioned basic information, in order to further identify different services under the same ONU, GPON Encapsulation Method (GEM) PORT or VLAN or the combination of the two can be chosen as an identity, and these messages together determine subscriber port information.

As to a multi-port GPON terminal equipment, there may be several different slots, and after receiving an access request protocol packet, the terminal equipment adds corresponding port information (including slot number, port, corresponding virtual port (like VLAN or Virtual Path Identifier (VPI)/Virtual Channel Identifier (VCI))) into the packet, and forwards this packet to the GPON office equipment, and the office equipment combines information of this packet and the above-mentioned basic information to get final port information, and adds the final port information into the access request protocol packet, to mark the subscriber port.

After receiving a subscriber access request message, the broadband access server extracts the subscriber port information. This port information can also be sent to an authentication server for authenticating, so as to implement binding authentication of subscriber account, password and the subscriber access port information.

Subscriber access manners supported by the present invention include PPPoE dial-in access and DHCP dial-in access, namely a GPON office equipment and multi-port GPON terminal implement PPPoE+ and DHCP option82 functions.

A GPON office equipment implements the positioning of different GPON terminals by adding ONU ID to the port information. As to a terminal with one port, the subscriber port can be accurately positioned according to GPON office information; as to a multi-port GPON terminal, it is required that the GPON terminal also implements PPPoE+ and DHCP option82 functions, the GPON office equipment and multi-port GPON terminal equipment use different fields to carry corresponding information respectively, so as to solve the access problem of the point-to-multipoint connection from a single GPON access port to a plurality of subscribers.

The existing technology has provided the default format of subscriber port information when the access point is a Digital Subscriber Line Access Multiplexer (DSLAM), with GPON office equipment as the access point, the following format may be adopted as a default format:

"Access-Node-Identifier gpon slot/port/onuid/gemport[:vlan-id]"

The network administrator can also define a more flexible port information format, access node identity of a GPON office access equipment may comprise computer room identity, rack number, frame number and other information.

A GPON terminal equipment with multiple subscribers just needs to provide corresponding slot number, port and corresponding virtual port information (VLAN or VPI/VCI), and the following format may be adopted as a default format:

"slot/port/[:vlan-id][:vpi.vci]"

With reference to the accompanying drawings, embodiments of the present invention will be illustrated in further details hereinafter.

As shown in FIG. 1, it is a diagram illustrating the point-to-multipoint connection relationship between a GPON office equipment and subscriber terminal equipment.

A GPON office equipment 11 is uplinked to a broadband access server 12, and the server 12 supports DHCP SERVER function and PPPoE terminating function, can analyze the request protocol packets sent by the GPON office equipment 11 and respond accordingly.

The GPON office equipment 11 is connected to several GPON subscriber terminal equipments (namely GPON terminal equipment) 10 through point-to-multipoint fibers, and supports PPPoE and DHCP proxy functions. The terminal equipments include single-port GPON subscriber terminal equipments (namely single-port terminal equipments) 101 and multi-port GPON subscriber terminal equipments (namely multi-port terminal equipments) 102, and the multi-port GPON subscriber terminal equipment 102 supports PPPoE and DHCP proxy functions.

A subscriber 13 initiates an access request utilizing PPPoE or DHCP protocol, the cases of DHCP and PPPoE will be respectively illustrated hereinafter.

Figure 2:
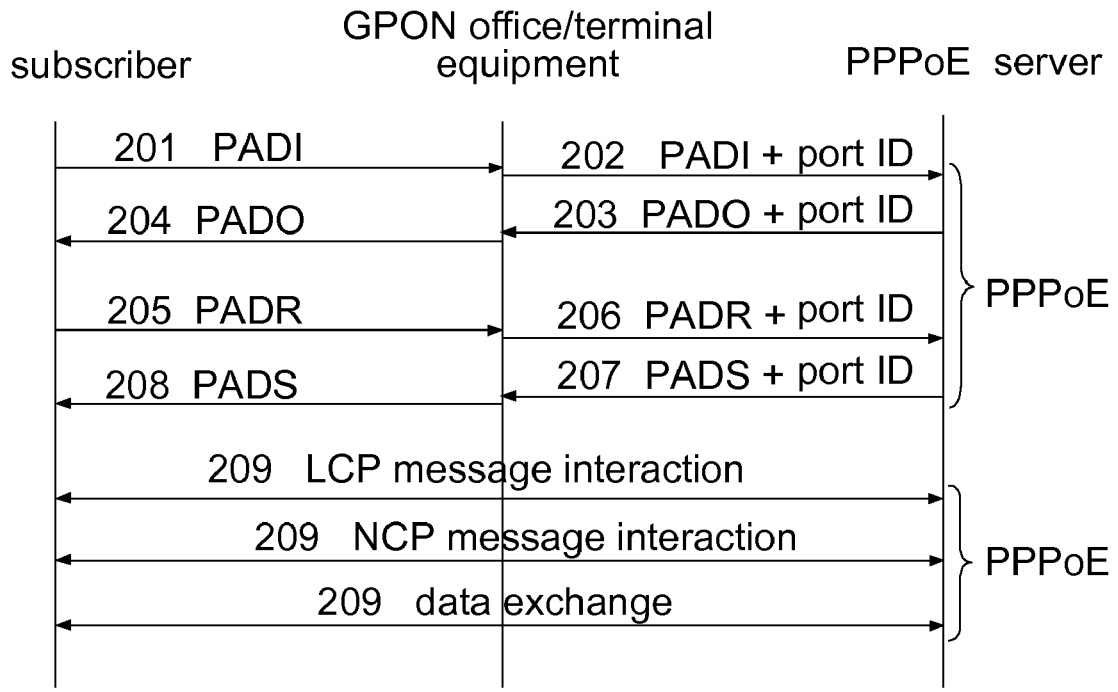
FIG. 2 is a flowchart illustrating the process of positioning a GPON subscriber port under a PPPoE connection mode in an embodiment of the present invention.

As shown in FIG. 2, it is a flowchart illustrating the process of positioning GPON subscriber ports under PPPoE connection mode in an embodiment of the present invention.

As to a subscriber using PPPoE access, the subscriber has a PPPoE client and is connected to corresponding GPON subscriber terminal equipment, a GPON office equipment and multi-port terminal equipment start the PPPoE+ function, add corresponding information as subscriber port positioning information of the GPON system. The process of the GPON office equipment in the procedure of PPPoE access authentication comprises the following steps:

step 201, the subscriber initiates a PPPoE Active Discovery Initiation (PADI) request;

step 202, GPON physical port information comprises: one of or a combination of several of such information as access node identity, access node rack number, access node frame number, access node slot number and sub-slot number, and access node port number;

as to a single-port terminal equipment, the terminal equipment does not process any PPPoE protocol packet; the GPON office equipment captures a ONU uplink PADI message, finds out to which ONU the subscriber data message is accessed, besides inserting the information of a GPON physical port to which the subscriber is accessed into the message, and adds to the port information the ONU ID and/or GEM Port ID/VLAN ID information for identifying different subscriber terminal equipments;

as to a multi-port terminal equipment, the terminal equipment captures a subscriber uplink PADI message, takes subscriber basic information (one of or a combination of several of such information as terminal node slot number and sub-slot number, access node port number, VLAN for a subscriber to access) as part of the information of subscriber port positioning for identifying this GPON terminal, and the corresponding subscriber basic information is added into Remote ID field; afterwards, the GPON office equipment captures the subscriber uplink PADI message, adds terminal basic information (GPON physical port information, ONU ID, or further including GEM Port ID/VLAN ID information) into this message to constitute subscriber port positioning information, and the terminal basic information is added into Circuit ID field of PPPoE; a modified message is sent to an uplink port afterwards;

step 203, a downlink PPPoE Active Discovery Offer (PADO) protocol message sent to the subscriber by a PPPoE server carries subscriber port positioning information;

in the step 203, after receiving the modified uplink request message, the PPPoE server extracts the subscriber port information, and sends the port information to an authentication server for authentication, so as to implement binding authentication of subscriber account, password and subscriber access port information;

step 204, the GPON office equipment captures the downlink PADO protocol message sent by the PPPoE server; as to a single-port terminal equipment, the GPON office equipment directly deletes the subscriber port positioning information from the message and sends the message to corresponding subscriber; as to a multi-port terminal equipment, the GPON office equipment can choose to delete all the subscriber port positioning information, or only delete office related port information, while the subscriber terminal equipment deletes the terminal related port information;

step 205, the subscriber sends an uplink PPPoE Active Discovery Request (PADR) data message to the PPPoE server;

step 206, the GPON office equipment captures the uplink PADR data message of ONU, as in step 202, adds subscriber basic information into the message and sends this message to an uplink port;

step 207, the PPPoE server sends a downlink PPPoE Active Discovery Session confirmation (PADS) data message to the subscriber, wherein, the message carries the subscriber port positioning information;

step 208, the GPON office equipment captures the downlink PADS data message sent by the PPPoE server, as in step 204, deletes the subscriber port positioning information from the message and sends the message to corresponding subscriber;

step 209, PPPoE discovery stage is over and a session stage starts, message interaction between Link Control Protocol (LCP) and Network Control Protocol (NCP) is performed, and then data exchange is performed, while the GPON office equipment does not capture data message during this stage.

Figure 3:
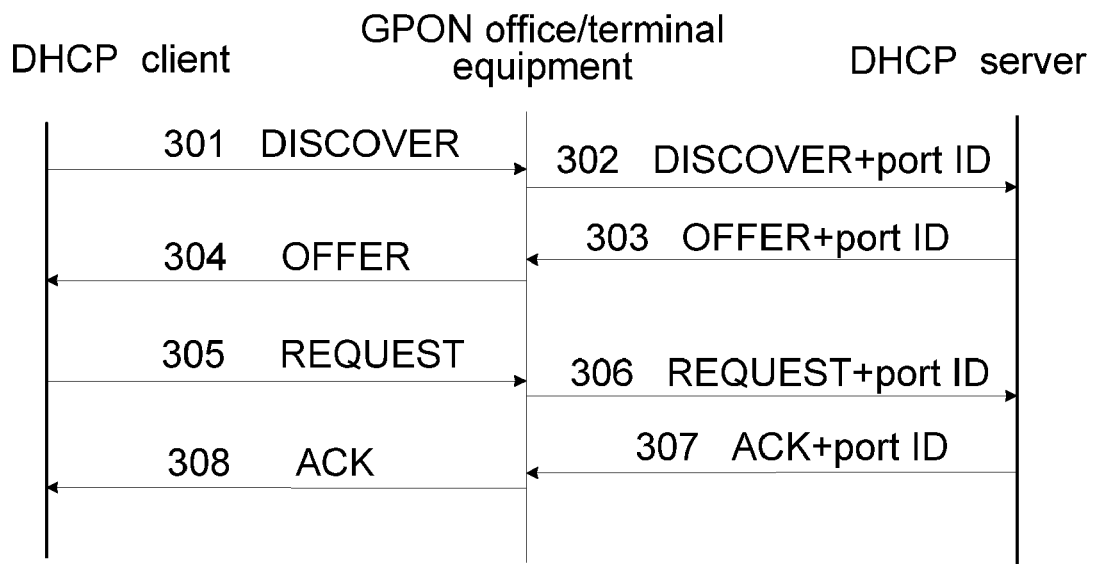
FIG. 3 is a flowchart illustrating the process of positioning a GPON subscriber port under a DHCP connection mode in an embodiment of the present invention.

As shown in FIG. 3, it is a diagram illustrating the process of positioning GPON subscriber ports under DHCP connection mode in an embodiment of the present invention.

As to a subscriber using DHCP access, the subscriber has a DHCP client and is connected to corresponding GPON subscriber terminal equipment, a GPON office equipment and multi-port terminal equipment start the DHCP proxy function, add corresponding information as subscriber port positioning information of the GPON system utilizing option82 field, and corresponding process can be finished according to the following steps:

step 301, the subscriber terminal initiates a DHCP DISCOVER protocol message;

step 302, GPON physical port information comprises: one of or a combination of several of such information as access node identity, access node rack number, access node frame number, access node slot number and sub-slot number, and access node port number;

as to a single-port terminal equipment, the terminal equipment does not process any DHCP protocol packet; the GPON office equipment captures a DHCP DISCOVER protocol packet, finds out to which ONU the subscriber data message is accessed, besides inserting the information of a GPON physical port to which the subscriber is accessed into the message, and adds to the port information the ONU ID and/or GEM PORT ID/VLAN ID information identifying different subscriber terminal equipments;

as to a multi-port terminal equipment, the terminal equipment captures a subscriber uplink DHCP DISCOVER message, takes subscriber basic information (one of or a combination of several of such information as access node slot number and sub-slot number, access node port number, and VLAN for a subscriber to access) as part of the information of subscriber port positioning for identifying this GPON terminal, and the corresponding subscriber basic information is added into Remote ID field; afterwards, the GPON office equipment captures the subscriber uplink DHCP DISCOVER message, adds terminal basic information (GPON physical port information, ONU ID, or further including GEM Port ID/VLAN ID information) into this message to constitute subscriber port positioning information, and the terminal basic information is added into Circuit ID field of DHCP option82; this message is forwarded to a DHCP SERVER afterwards;

step 303, after receiving the marked DHCP DISCOVER packet, the DHCP SERVER extracts corresponding port identity information, performs further process according to the acquired port information, authenticates the subscriber according to the user name and password together with the acquired port information, then responds a DHCP OFFER protocol packet;

step 304, after capturing the DHCP OFFER protocol packet, as to a single-port terminal equipment, the GPON office equipment directly deletes the subscriber port positioning information from the message and sends the message to corresponding subscriber; as to a multi-port terminal equipment, the GPON office equipment can choose to delete all the subscriber port positioning information, or only delete office related port information, while the subscriber terminal equipment deletes the terminal related port information;

step 305, the subscriber sends out a DHCP REQUEST protocol packet;

step 306, the GPON office equipment captures the DHCP REQUEST protocol packet sent by the subscriber, as in step 302, adds corresponding port information into the packet, and forwards this packet to the DHCP SERVER afterwards;

step 307, after receiving the marked DHCP REQUEST packet, the DHCP SERVER extracts corresponding port identity information, and responds a DHCP ACK;

step 308, after capturing the DHCP ACK protocol packet, as to a single-port terminal equipment, the GPON office equipment directly deletes the subscriber port positioning information from the message and sends the message to corresponding subscriber; as to a multi-port terminal equipment, the GPON office equipment can choose to delete all the subscriber port positioning information, or only delete office related port information, while the subscriber terminal equipment deletes the terminal related port information.

As to PPPoE protocol, port information of a multi-port GPON terminal (subscriber basic information) is added into the Remote ID field of the 0x0105 type tag of discovery stage uplink PADI and PADR messages; as to DHCP protocol, the port information (subscriber basic information) is added into the Remote ID field of the option82 option of uplink DHCP DISCOVER and REQUEST messages. Port information format supports flexible configuration, and a default format is:

"slot/port/[:vlan-id]"

For example, "3/0/:2000" denotes a service whose access point identity is in such format as slot 3, port 0 and service VLAN 2000.

As to PPPoE protocol, port information of GPON office (terminal basic information) is added into the Circuit ID field of the 0x0105 type tag of discovery stage uplink PADI and PADR messages; as to DHCP protocol, port information of the GPON office (terminal basic information) is added into the Circuit ID field of the option82 option of uplink DHCP DISCOVER and REQUEST messages. The format can be defined referring to DSL forum TR101. Port information format supports flexible configuration, and a default format is:

"Access-Node-Identifier gpon slot/port/onuid/gemport[:vlan-id]"

for example, "CTC200.200.200.200 gpon 3/2/1/1:200" means that, the access point identity is CTC200.200.200.200, the access type is GPON access, the terminal equipment with ONU ID as 1 under the access port of slot 3 and port 2, GEMPORT is 1 and service VLAN is 200.

Port positioning information is finished transmitting to DHCP SERER function. The DHCP SERVER can perform further process according to extracted port information, and authenticate the subscriber based on the subscriber name and password together with the extracted port information, so as to solve the problem of positioning the subscriber port to which a GPON broadband subscriber is accessed.

Certainly, the present invention further comprises many other embodiments, and to those skilled in the art, without departing from the spirit and essence of the present invention, various modifications and changes can be made to the present invention, but these corresponding modifications and changes should be included within the protection scope of the appended claims of the present invention.

INDUSTRIAL APPLICABILITY

The present invention provides a method for implementing subscriber port positioning by broadband access equipments, so as to solve the problem that a subscriber cannot be positioned when a plurality of subscriber terminal equipments are accessed to one GPON port of a GPON office access equipment, so that a subscriber can be accurately positioned under a point-to-multipoint connection mode.

What is claimed is:

1. A method for implementing subscriber port positioning by broadband access equipments, applied in a GPON system, comprising the following steps:
   (1) when a subscriber initiates an access request for a multi-port terminal equipment, the terminal equipment capturing an access request message, adding subscriber basic information into the access request message and sending this message to an office equipment, or when the subscriber initiates an access request for a single-port terminal equipment, the terminal equipment directly forwarding the access request message to the office equipment;
   (2) the office equipment capturing the access request message, adding terminal basic information into the access request message and forwarding this message to a broadband access server; wherein, for the multi-port terminal equipment, the terminal basic information and the subscriber basic information together make up subscriber port positioning information, and for the single-port terminal equipment, the terminal basic information alone makes up the subscriber port positioning information;
   (3) after receiving the access request message sent by the subscriber, the broadband access server extracting the subscriber port positioning information.

2. The method according to claim 1, wherein, in step (3), after extracting the subscriber port positioning information, the broadband access server further sends the subscriber port positioning information to an authentication server for binding authentication of subscriber account, password, and the subscriber port positioning information of the subscriber.

3. The method according to claim 2, wherein, in step (1), the subscriber basic information comprises one of or a combination of several of the following information:
   slot number and sub-slot number of the terminal node, port number of the access node, and corresponding virtual port information.

4. The method according to claim 3, wherein, the corresponding virtual port information comprises:
   virtual local area network port information, or virtual path identifier/virtual channel identifier.

5. The method according to claim 2, wherein, in step (2), the terminal basic information is used for identifying different terminal equipments connected to the office equipment port, so as to position different terminal equipments; the terminal basic information comprises: physical port information of the office equipment for the subscriber to access and ID information of the terminal equipment.

6. The method according to claim 5, wherein, in step (2), the terminal basic information further comprises:
   one of or the combination of GPON encapsulation mode port identity and corresponding virtual port information.

7. The method according to claim 6, wherein, the corresponding virtual port information comprises:
   virtual local area network port information, or virtual path identifier/virtual channel identifier.

8. The method according to claim 5, wherein, in step (2), the physical port information comprises one of or a combination of several of the following information:

access node identity, access node rack number, access node frame number, access node slot number and sub-slot number, and access node port number.

9. The method according to claim 2, wherein, the office equipment is an Optical Line Terminal (OLT), and the terminal equipment is an Optical Network Unit (ONU).

10. The method according to claim 2, wherein, the access manners of the subscriber comprise: Point-to-Point Protocol over Ethernet dial-in access, and Dynamic Host Configuration Protocol dial-in access.

11. The method according to claim 1, wherein, the office equipment is an Optical Line Terminal (OLT), and the terminal equipment is an Optical Network Unit (ONU).

12. The method according to claim 1, wherein, the access manners of the subscriber comprise: Point-to-Point Protocol over Ethernet dial-in access, and Dynamic Host Configuration Protocol dial-in access.

* * * * *